United States Patent [19]
Kroll

[11] Patent Number: 5,225,934
[45] Date of Patent: Jul. 6, 1993

[54] KALEIDOSCOPE WITH COUNTER-ROTATING OBJECT WHEELS

[76] Inventor: Frederick H. Kroll, 11289 Piping Rock Dr., Boynton Beach, Fla. 33437

[21] Appl. No.: 895,261

[22] Filed: Jun. 12, 1992

[51] Int. Cl.⁵ .................................. G02B 23/00
[52] U.S. Cl. ................................... 359/616
[58] Field of Search .............. 359/616, 617; 353/1, 353/2

[56] References Cited

U.S. PATENT DOCUMENTS

| | | | |
|---|---|---|---|
| 416,092 | 11/1889 | Clawson | 359/617 |
| 877,645 | 1/1908 | Hare | 359/617 |
| 2,493,238 | 1/1950 | Eddy | 359/616 |
| 2,727,426 | 12/1955 | Lopez | 359/617 |
| 2,757,570 | 8/1956 | Molnar | 359/617 |
| 2,763,078 | 9/1956 | Graves | 359/617 X |
| 2,786,292 | 3/1957 | Graves | 359/616 |
| 2,954,723 | 10/1960 | Dunn | 359/616 |
| 3,030,856 | 4/1962 | Jordan | 359/616 X |
| 3,122,859 | 3/1964 | Reaux, Jr. | 359/616 X |
| 3,160,975 | 12/1964 | Malina | 359/616 X |
| 3,343,453 | 9/1967 | Butterfield | 359/616 X |
| 3,748,013 | 7/1973 | Orans | 359/617 |
| 4,231,634 | 11/1980 | Gantz et al. | 359/617 |

*Primary Examiner*—Richard A. Wintercorn
*Attorney, Agent, or Firm*—Harry W. Barron

[57] ABSTRACT

A kaleidoscope in a housing includes inner and outer object wheels with transparent portions and visible patterns, mounted to turn in opposite directions when a crank extending from a side of the housing is manually turned. A diffusion filter is mounted at an end of the housing to project diffuse illumination through the wheels when this end is held toward a light source. Elongated, inward directed reflective surfaces extend between the inner object wheel and a viewing hole in an end of the housing opposite to the filter. A shaft extends inward, within the housing, from the outer object wheel to an attached outer wheel drive gear. An inner wheel drive gear, turns on the shaft in engagement with the inner object wheel. The crank engages a crank drive gear engaging the inner and outer wheel drive gears on opposite sides of the crank drive gear, so that the inner and outer object wheels are rotated in opposite directions.

20 Claims, 3 Drawing Sheets

KALEIDOSCOPE WITH COUNTER-ROTATING OBJECT WHEELS

BACKGROUND OF THE INVENTION

Field of the Invention

This invention relates to a kaleidoscope, and more particularly, to a kaleidoscope having counter-rotating object wheels with a crank operated drive mechanism.

Background Information

A kaleidoscope typically includes a viewing end, with a central hole to be used as an eyepiece, an object end, with a rotatable object wheel to be viewed. Between the two ends is an elongated tubular housing having elongated reflective surfaces facing each other to meet at an edge forming an angle and a third reflective surface forming a base of an isosceles triangle, of which the other two reflective surfaces are sides. A means is typically provided for trans-illuminating the object wheel, so that it can be seen both directly and in reflected form from the viewing end. Typically, such trans-illumination is provided merely by an outer disk at the object end, having a diffuse surface, which can be held up to a suitable light source. When the kaleidoscope is viewed in this way, the direct image of the object wheel is seen as a sector of a circle with radial boundaries being formed by the mirrors, and various reflections of the object wheel image are seen as additional adjacently joined sectors.

The object wheel of a kaleidoscope is typically a closed drum or object box partly filled with granular colored objects. An outer flat side of the object box is a translucent material, or a transparent material with a diffusing surface to provide suitable modification of ambient light. The objects filling the object box may include, for example, bits of paper and colored plastic. Since only a portion of the object wheel is seen at a time, and since this portion is reflected a number of times to form adjacent images in a geometric pattern, a colorful, abstract, geometrically repeating image pattern is viewed. The rotation of the object wheel, or the movement of granular colored objects in a drum, produces changes in this image pattern.

A common way of configuring a hand held kaleidoscope is to provide a viewing tube with elongated internal mirror surfaces and an end tube mounted to be manually turned relative to the viewing tube. An object box, holding various colored objects, with a diffuse translucent outer surface for trans-illumination is mounted in the outer end of the end tube. Thus, holding the viewing tube while manually turning the end tube directed toward a light source produces the kaleidoscopic effect.

Description of the Prior Art

The prior art describes a number of variations and refinements in the design of kaleidoscopes, including means for rotationally driving object wheels or boxes. For example, U.S. Pat. No. 416,092, issued to C.C. Clawson on Nov. 26, 1889 describes a kaleidoscope having an object box, containing loose objects in compartments formed by dividing glass plates, rotatably driven by suitable means, such as a falling weight unwinding a wire from a drum, together with a music box mechanism. An electric lamp is provided for the trans-illumination of the object box, with either or both the mechanical motion and/or the illumination being permitted for a certain time by a coin activated mechanism.

U.S. Pat. No. 877,645, issued on Jan. 28, 1908 to J.R. Hare, describes a kaleidoscope having a pair of axially adjacent object boxes rotationally driven in opposite angular directions by a system of belts and pulleys operated by a suitable power source. Annular corrugations around the inner surface of each object box cause the movement of objects within the box, as the box is rotation, and a several electric lights in each box are allowed to swing on wires connecting them to a power source through rings held in contact with brush springs along edges of the box. The Hare kaleidoscope is complex and incapable of being placed in a small hand held enclosure for a kaleidoscope toy.

U.S Pat. No. 2,727,426, issued to D.C. Lopez on Dec. 10, 1955, describes a kaleidoscope having a single object box, rotationally driven by an electric motor through a gear train, holding reflective particles. The axis of the object box is tilted downward from the horizontal axis of the mirrored kaleidoscope tube, and illumination is provided by an electric light above the object box. The downward turned face of this box is internally covered with a mat divided into quadrants of different colors.

The patents mentioned above each describe a version of a kaleidoscope which is mounted within a large floor standing unit. On the other hand, U.S. Pat. No. 3,748,013, issued to A.A. Orans on Jul. 24, 1973, describes a kaleidoscope having an object end placed within a desk stand. Illumination of the object box from its cylindrically curved side is provided by a lamp mounted inside the stand or at a side of the kaleidoscope. The outer side of the object box is attached to an outward extending bevel gear, which is rotationally driven by a bevel gear attached to a shaft extending across the stand to be manually turned by a knob extending outward from each side of the stand.

While the patents mentioned above teach the use of an object box containing loose objects, U.S. Pat. No. 2,493,238, issued to W.C. Eddy on Jan. 3, 1950, describes a kaleidoscopic image projector using a transparent object wheel to which a photographic plate is attached to form an image. This wheel is rotationally driven by an electric motor. A rotatable masking disk is further provided, adjacent to the object wheel, having openings to allow the passage of light through certain portions of the object wheel while blocking light from other portions of the wheel. The masking disk may be rotationally positioned, or it may be independently driven by a separate motor.

SUMMARY OF THE INVENTION

In accordance with one aspect of the invention, there is provided a kaleidoscope including a partly transparent outer object wheel, with an outer visible pattern on a flat surface thereof and a partly transparent inner object wheel, with an inner visible pattern on a flat surface thereof. In addition, the kaleidoscope includes a filter surface for directing diffused light through the outer and inner object wheels when the filter surface is held toward a light source and a housing extending from the filter surface to a viewing port. Further, the kaleidoscope includes a pair of angularly separated, inward facing, elongated reflective surfaces extending within the housing between the inner object wheel and the viewing port, exposing a fractional portion of the inner object wheel to the viewing port. Finally, the kaleidoscope includes a crank extending outward from a side of the housing, rotatably mounted within the housing, mounting means to mount the outer and inner object wheels to turn about a common axis, and drive means for rotating the outer and inner object wheels in opposite directions when the crank is turned.

BRIEF DESCRIPTION OF THE FIGURES

Preferred versions or embodiments of the subject invention are hereafter described, with specific references being made to the following Figures, in which:

FIG. 3 is a fragmentary elevational view of the engaged hub portions of a crank and drive gear of the kaleidoscope of FIG. 1;

DESCRIPTION OF THE INVENTION

Figure 1:
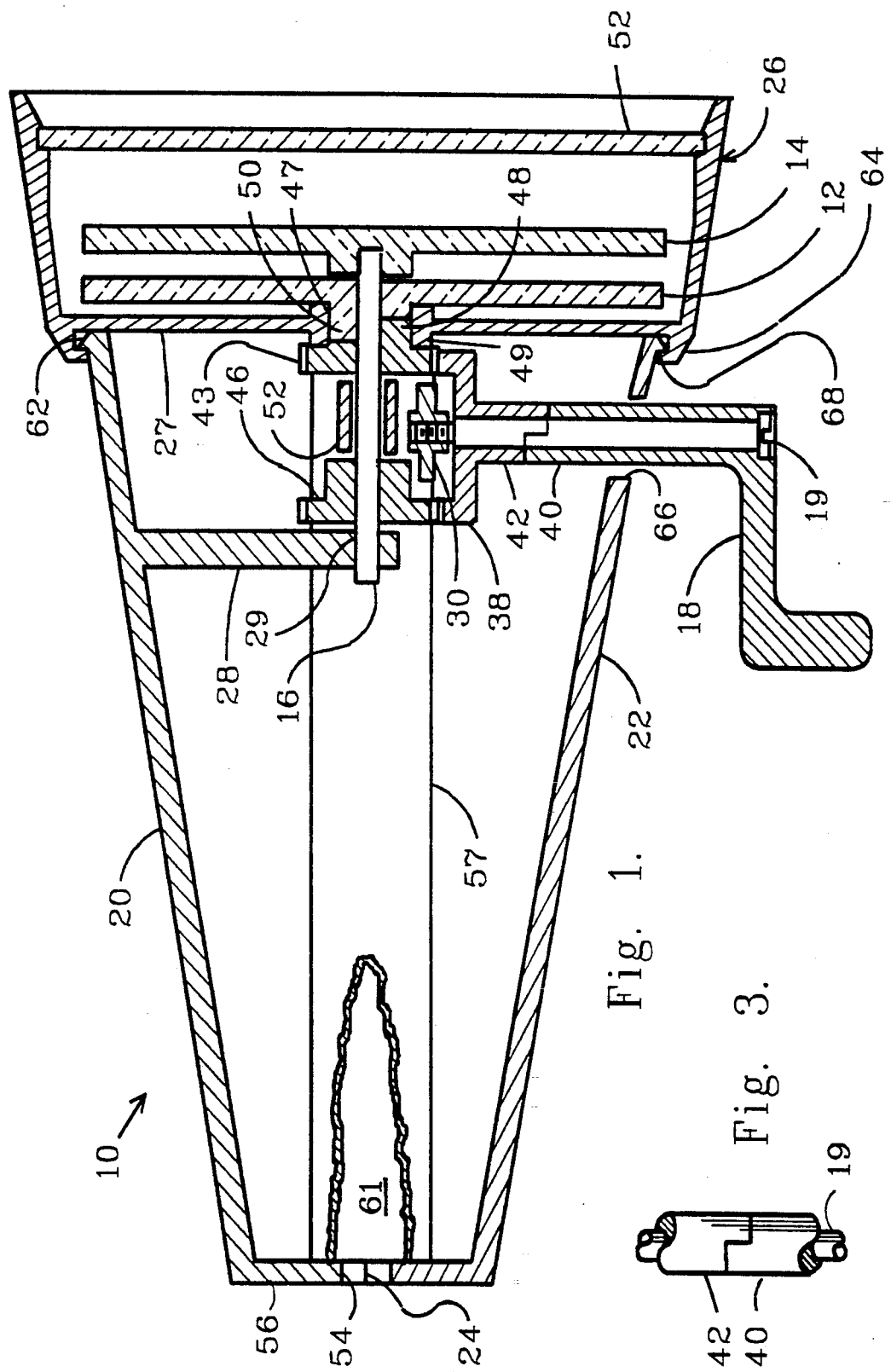
FIG. 1 is a top sectional elevation view of a kaleidoscope built in accordance with the subject invention.
Figures 2, 4:
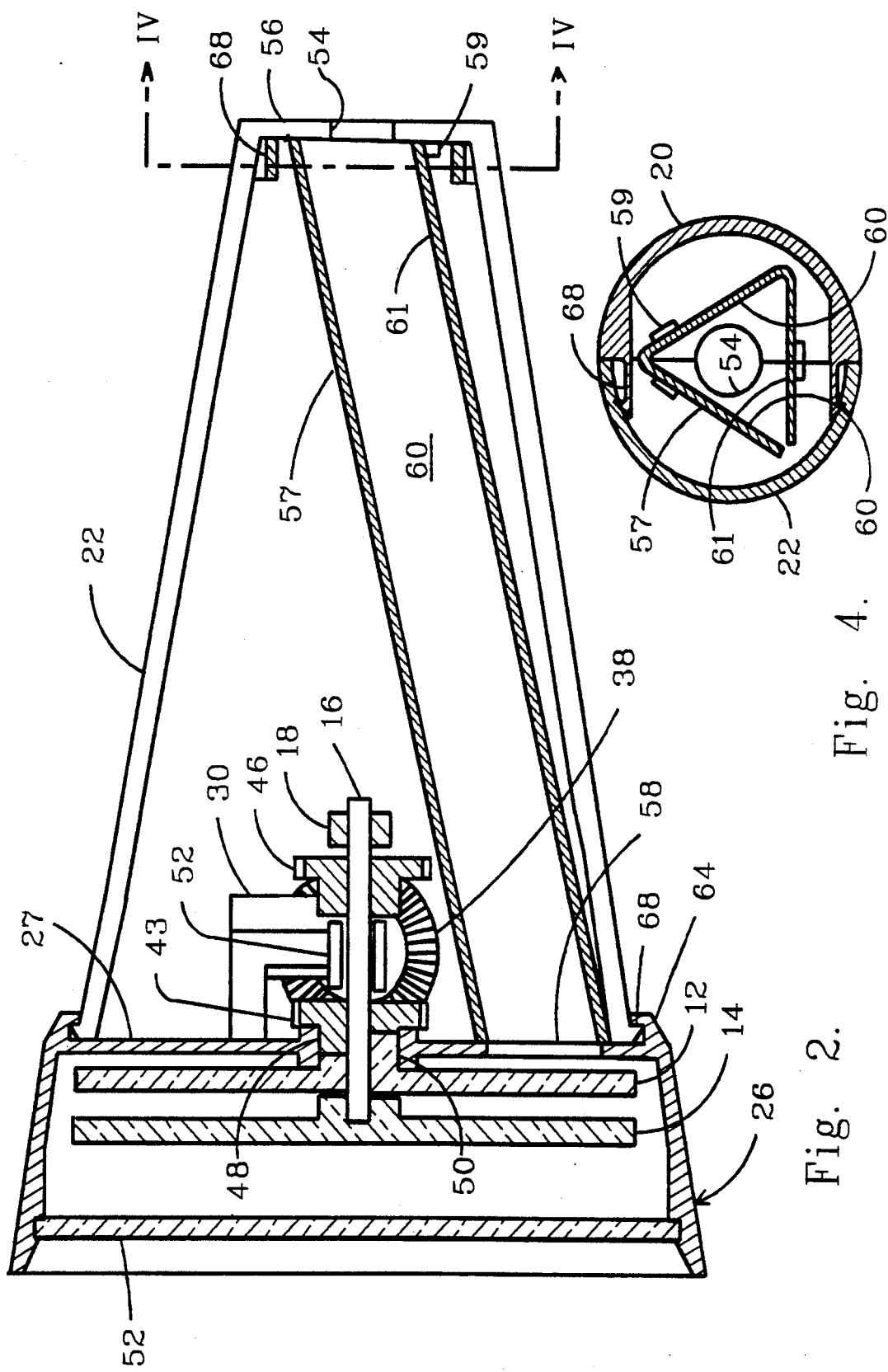
FIG. 2 is left side sectional elevation view of the kaleidoscope of FIG. 1.
FIG. 4 is an end sectional elevation of the kaleidoscope of FIG. 1, being taken as indicated by line IV—IV in FIG. 2.

FIGS. 1 and 2 provide transverse sectional views of a kaleidoscope 10, with FIG. 1 being a top view and FIG. 2 being a side view. Referring first to FIG. 1, kaleidoscope 10 includes an inner object wheel 12 and an outer object wheel 14 arranged to turn in opposite directions about the axis of a shaft 16. Shaft 16 is driven by the manual rotation of a crank 18 on crank axle screw 19. A framework structure for supporting various moving elements of kaleidoscope 10 includes a left housing shell 20 and a right housing shell 22, held together by snap locks positioned along a plane in and out (relative to the drawing of FIG. 1) through the centerline through FIG. 1. In addition, the framework is held together by an end cap 26, which includes a disk 27 extending across the opening provided by shells 20 and 22. Left shell 20 includes an inward extending boss 28, having a hole 29 through which shaft 16 freely rotates.

Referring also to FIG. 2, disk 27 has an "L" shaped internal flange 30 extending from a position approximately mid way between the radial center and the periphery of disk 27 to provide a mount for mounting threaded end 34 of crank axle screw 19. Crank 18 and a crank drive gear 38 are mounted to turn together on axle screw 36 as crank 18 is turned manually. As shown in FIG. 3, hub 40 of crank 18 and hub 42 of gear 38 face each other on axle screw 19 and are provided with mating stepped surfaces so that, when hubs 40 and 42 are held together, for example by a threaded machine bolt (not shown), crank 18 and gear 38 turn together. Referring again to FIGS. 1 and 2, crank drive gear 38 is a crown gear, which meshes with inner wheel drive gear 43 on one side and with outer wheel drive gear 46 on an opposite side. Wheel drive gears 43 and 46 have similar numbers of teeth, so they are driven at the same rotational speed, but in opposite angular directions, by rotating crank drive gear 38.

Both outer object wheel 14 and outer wheel drive gear 46 are firmly pressed on shaft 16, which thereby transmits angular motion from gear 46 to object wheel 14 through an opening 47 bounded by lips 49 in the center of disk 27. Inner wheel drive gear 43, and its associated hub 48, and inner object wheel 12, and its associated hub 50, are rotatably mounted around shaft 16 and within lips 49 of opening 47. Hub 48 of drive gear 43 and hub 50 of inner drive wheel 12 are provided with mating stepped surfaces, similar to those of hubs 40 and 42, so that when hubs 48 and 50 are held together, for example by the inclusion of sleeve 52 on shaft 16, inner wheel drive gear 43 and inner wheel 12 turn together. The outer surfaces of hubs 48 and 50 and lips 49 provide a bearing support function for the mechanisms on shaft 16 when turning in opening 47 of disk 27.

A light diffusion filter 52, held within end cap 26 near its outer end, may be made from any optically translucent material, such as an optically clear plastic material, having either or both of its flat surfaces formed with a roughened pattern sufficient to diffuse ambient light. Trans-illumination of object wheels 12 and 14 is achieved by the light passing through filter 52 when filter 52 is pointed towards a light source. Object wheels 12 and 14 may have various patterns printed on the flat surfaces thereof, which may be transparent, or translucent. Preferably, brightly colored areas are favored to produce effective kaleidoscopic effects. Various other well known techniques for inlaying, or otherwise attaching, colored materials to object wheels 12 and 14 may be used instead of printing.

Object wheels 12 and 14 are viewed, when illuminated, through a viewing hole 54 within viewing end 56 of kaleidoscope 10. The kaleidoscope effect is created through the use of a folded mirror 57 extending between viewing end 56 and a triangular opening 58 spaced from the center of disk 27. As shown in FIG. 4, folded mirror 57, is held in place within housing shells 20 and 22 by interior supports 59, and includes inner reflective surfaces 60, facing each other at an angle and forming equal sides of an isosceles triangle, and base reflective surface 61, forming the third side, or base, of the isosceles triangle. For example, the triangle formed by reflective surfaces 60 and 61 may be equilateral, with all three angles being sixty degrees, as seen in FIG. 4. Alternatively, the angle between reflective surfaces 60 may be thirty degrees, with each reflective surface 60 extending upward from base reflective surface 61 at a seventy-five degree angle. When the kaleidoscope is viewed through viewing hole 54, a portion of object wheels 12 and 14 is seen directly through triangular opening 58, and multiple reflections of this portion are seen from reflective surfaces 60 and 61, producing the kaleidoscope effect.

Referring again to FIG. 1, kaleidoscope 10 is assembled by pressing outer object wheel 14 on an end of shaft 16. Inner object wheel 12 is then placed over shaft 16, and the resulting assembly is placed within end cap 26, with hub 50 of inner object wheel 12 extending through the central hole in disk 27 of end cap 26. Sleeve 52 is next placed over shaft 16, and outer wheel drive gear 46 is pressed in place on shaft 16. The assembly thus formed is next placed into left housing shell 20, with shaft 16 extending through the hole in boss 28 and with left shell flange 62 lying within a slotted inner rim 64 of end cap 26. Next, crank 18 is placed over crank axle screw 19 and into a hole 66 of right housing shell 22. Crank drive gear 42 is also placed on screw 19 and right housing shell 22 is snapped into place with right shell flange 68 lying within slotted inner rim 64 of end cap 26. As shown in FIGS. 2 and 4, a pair of flexible snap latches 68 are used to latch housing shells 20 and 22 together at viewing end 56.

Figure 5:
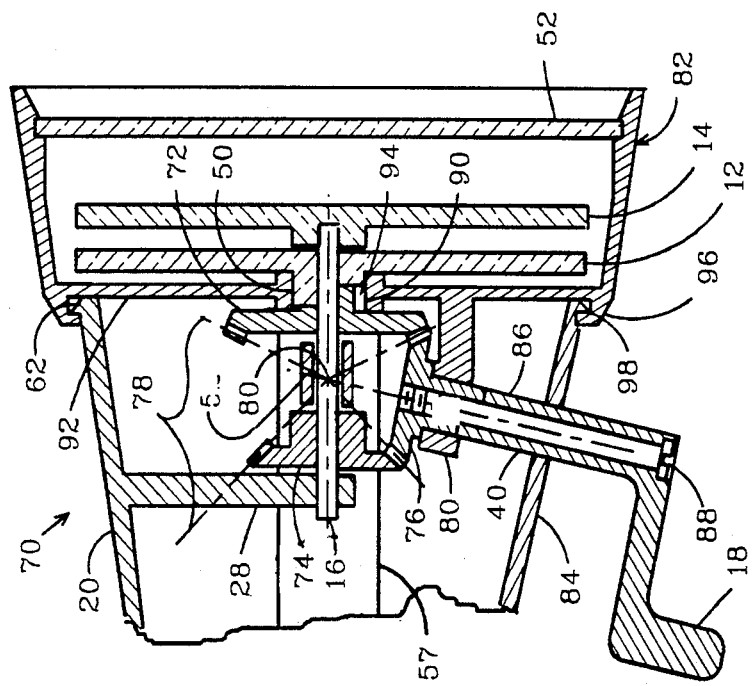
FIG. 5 is a fragmentary top sectional elevation of a kaleidoscope having a mechanical drive mechanism built in accordance with a variation of the subject invention.

Referring now to FIG. 5, an alternative mechanism 70 for driving object wheels 12 and 14 with the motion supplied by a hand crank is shown. Mechanism 70 includes a number of variations from the corresponding mechanism previously discussed with reference to FIG. 1 through 4. These variations can be applied together, as shown in FIG. 5, or individually to form a number of different configurations. In the following discussion, elements which can be similar or identical to those elements which have been previously discussed are referred to with their previous reference numerals.

In mechanism 70, inner wheel drive gear 72 turns is larger in diameter than outer wheel drive gear 74. Thus, the outer object wheel 14, driven by gear 74, rotates at a higher angular velocity than inner object wheel 12, driven by gear 72. In this situation, a much greater variety of kaleidoscopic images are formed by the aligned combination of patterns on object wheels 12 and 14. On the other hand, with a mechanism providing equal angular velocities for wheels 12 and 14, such as the mechanism shown in FIGS. 1 through 4, wheels 12 and 14 complete single revolutions at the same time, so the combinations of patterns repeat with each revolution of these wheels.

The previously discussed configuration (shown in FIG. 1) of a crown gear used for crank drive gear 42, together with a pair of spur gears used for wheel drive gears 43 and 46, has been replaced by a bevel gear used for crank drive gear 76, together with a pair of bevel gears for wheel drive gears 72 and 74. To achieve proper meshing along with the desired difference in wheel drive speeds, these bevel gears 72, 74, and 76 mesh along conical pitch surfaces 78, having vertices at the intersection 80 of the axes of shaft 16 and of crank drive gear 76. The axis of gear 76 is slanted relative to the axis of shaft 16 to achieve the difference in diameters between gears 72 and 74. The other condition which is met by appropriate scaling factors is that gears 72, 74, and 76 must have integral numbers of teeth. Bevel gears can also be used in a configuration having equal sizes of gears driving wheels 12 and 14. In such a configuration, the axis of gear 76 and shaft 16 are mutually perpendicular. The structure relating to the use of screw 19 as an axle, on which crank 18 and drive gear 42 turn together, has been enhanced in mechanism 70 by additionally providing a support bearing hole in an inward extending tab 80 from end cap 82, and a second support bearing opening in right shell housing 84. An attachment screw 88 turning with crank 18 and gear 76, is used to hold hub portions 40 and 86, which are provided with stepped interface surfaces as previously discussed in reference to FIG. 3, together.

The assembly of mechanism 70 is begun by pressing outer object wheel 14 on shaft 16 and by slipping inner object wheel 12 over shaft 16. Next, hub 86 of crank drive gear 76 is inserted in the bearing hole of tab 80, and hub 90 of inner wheel drive gear 72 is inserted in the central hole of disk portion 92 of end cap 82. Diametral clearance 94 is provided between the outer diameter of hub 90 and the diameter of the central hole in portion 92, so that these parts can be easily assembled despite the presence of crank drive gear 76 within the support hole of tab 50. Next, shaft 16 is inserted through the hole of drive gear 72, until hub 50 of inner object wheel 12 extends into the central hole of disk portion 92, being free to turn therein with drive gear 72. Hubs 50 and 90 are provided with stepped mating surfaces, so that wheel 12 and gear 43 turn together on shaft 16, with the central hole of disk portion 92 providing a support bearing function around the outer surface of hub 50. Next, sleeve 52 is slid onto shaft 16, and drive gear 74 is pressed into place on this shaft.

The assembly thus formed is mated with left housing shell 20 by pushing the exposed end of shaft 16 into the hole of boss 28, and flange 62 of shell 20 is snapped into slotted inner rim 96 of end cap 82. Right housing shell 84 is next snapped in place, with flange 98 being snapped into place in rim 96, and with flexible latches as described in reference to FIG. 4 holding housing shells 20 and 84 together at the viewing end. Finally, crank 18 is slid, through the hole provided for this purpose in right housing shell 84, into engagement with gear 76, and screw 88 is driven into place to fasten crank 18 and gear 76 together.

Figure 6:
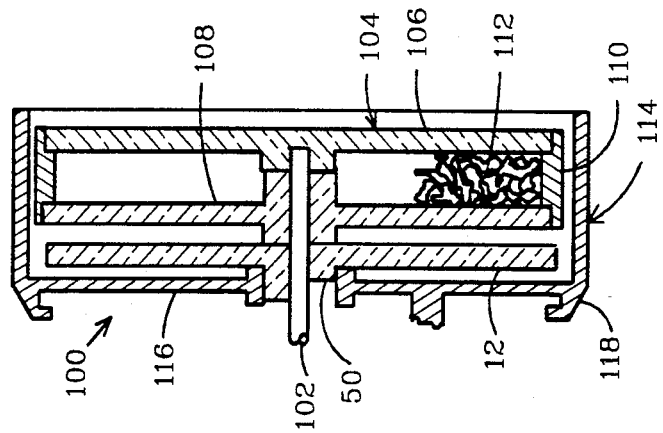
FIG. 6 is a top sectional elevation of an object wheel portion of a kaleidoscope built in accordance with a second variation of the subject invention.

Referring now to FIG. 6, an alternative object arrangement 100 is shown and is to be driven, for example, by either of the drive mechanism discussed with respect to FIG. 1 or by the alternative drive mechanism 70 discussed with respect to FIG. 5. Alternative arrangement 100 includes an object wheel 12, as previously discussed, freely turning on a shaft 102, which is somewhat longer than shaft 16, and an object box 104, which is pressed in place to turn with shaft 102. Object box 104 includes an outer disk 106, an inner disk 108, and an outer ring 110, which are pressed together on shaft 102 to form a chamber holding a number of brightly colored, transparent or translucent objects 112. Object box 104 and inner object wheel 12 are placed within an end cap 114, which additionally includes a disk 116, similar to previously described disks 27 and 92, and a grooved flange 118 for accepting for attachment the kaleidoscope housing shells.

When shaft 102 is rotated by a mechanism as previously described, various of objects 112 are dragged partly along, due to friction with the inner surfaces of object box 104. If the kaleidoscope is held so that shaft 102 is more horizontal than vertical, objects 112 moved somewhat upward and subsequently fall back downward under the influence of gravity. When viewed through an elongated, triangular folded mirror 57, as previously described in reference to FIG. 4, such objects form a number of symmetrical colored patterns, with reflected images of the objects move together and come apart as object box 104 is rotated.

In a preferred version of this alternative arrangement, outer disk 106 is made from an optically translucent material, or from a transparent material to include a surface textured to produce the effect of a light diffusing filter. Thus, when outer disk 106 is held up to a typical exterior light source, incoming light is conditioned by diffusion for trans-illuminating objects 112 and inner object wheel 12.

Furthermore, in accordance with a preferred version of this arrangement, the exterior side of inner disk 108 includes a printed pattern having areas of varying color and opacity. As previously described, the drive mechanism within the kaleidoscope rotates shaft 102 in one direction and inner object wheel 12 in an opposite direction. Thus, the kaleidoscopic effect is developed using the coherent patterns on inner object wheel 12 and on inner disk 108 rotating in opposite directions, along with the relatively incoherent effects of the motion of objects 112.

The use of coherent patterns travelling in opposite directions in this way is more effective from a visual standpoint than the use of counter-rotating object boxes producing relatively incoherent images, which may be similar regardless of the direction of rotation. Thus, both a kaleidoscope using the arrangement discussed in relation to FIG. 6, and a kaleidoscope built as described in reference to FIGS. 1 through 5, have an advantage over a kaleidoscope built as described in the prior art U.S. Pat. No. 877,645 to Hare, where two object boxes without coherent images are turned in opposite directions at the same rotational speed. Furthermore, a kaleidoscope built in accordance with the present invention can be hand held to be turned with a small crank, while the device of Hare is a part of a much larger floor standing unit. Nevertheless, the arrangement of FIG. 6 can be further modified by replacing object wheel 12 with another object box partly filled with objects 112. This modification can also include coherent patterns on the disk shaped structures of each object box. Additionally, the hand crank structure 18 may be replaced by a small electric motor or wind up spring motor.

What is claimed is:

1. A kaleidoscope comprising:
   an outer object wheel, with an outer visible pattern on a flat surface thereof;
   means for transmitting illumination to said outer visible pattern;
   a central drive shaft extending inward from said outer object wheel, said outer object wheel and said central drive shaft being coupled to turn together;
   a partly transparent inner object wheel with an inner visible pattern on a flat surface thereof, said inner object wheel being mounted to turn on said central drive shaft;
   an inner wheel drive gear mounted to turn on said central drive shaft, said inner wheel drive gear having drive surfaces engaging said object wheel to turn with said inner wheel drive gear;
   an outer wheel drive gear fastened to said central drive shaft to turn with said central drive shaft, said inner and outer wheel drive gears being axially separated on said central drive shaft;
   a system drive gear rotatably mounted to engage said inner and outer wheel drive gears at opposite sides of said system drive gear;
   drive means for rotating said system drive gear;
   a housing extending between said inner object wheel and a viewing port;
   a pair of angularly-separated, inward-facing, elongated reflective surfaces extending within said housing between said inner object wheel and said viewing port.

2. The kaleidoscope of claim 1:
   wherein said system drive gear is a crown gear;
   wherein said inner and outer wheel drive gears are spur gears; and
   wherein said central drive shaft and said system drive gear are mounted to rotate about axes which are mutually perpendicular.

3. The kaleidoscope of claim 1 wherein said drive gears are bevel gears.

4. The kaleidoscope of claim 3 wherein said inner and outer drive gears are of equal diameters.

5. The kaleidoscope of claim 3:
   wherein said inner and outer drive gears are of different diameters;
   wherein said central drive shaft and said system drive gear are mounted to rotate about axes which meet at a point of intersection, with said axes lying in an acute angle relative to each other; and
   wherein said inner and outer drive gears meshingly engage said system drive gear along conical surfaces extending from said point of intersection.

6. The kaleidoscope of claim 1 wherein said drive means comprises a crank extending outside said housing.

7. The kaleidoscope of claim 1:
   wherein said means for transmitting illumination to said outer visible pattern comprises a translucent diffusion filter for illuminating said outer visible pattern with diffused light when said filter is orientated toward a light source; and
   wherein said outer object wheel transmits light.

8. The kaleidoscope of claim 7:
   wherein said housing includes an end cap surrounding said inner and outer object wheels; and
   wherein said filter is held within said end cap.

9. The kaleidoscope of claim 7:
   wherein said filter is attached to said outer object wheel by an outer ring to form an outer object box;
   wherein said object box is loosely filled with a plurality of freely movable objects; and
   wherein said housing includes an end cap surrounding said inner object wheel and said outer object box.

10. The kaleidoscope of claim 1 wherein said angularly-separated elongated reflective surfaces are separated by an angle which is a submultiple of 360 degrees.

11. The kaleidoscope of claim 10, comprising in addition a third inward-facing elongated reflective surface forming a base of an isosceles triangle having said pair of angularly-separated elongated reflective surfaces as sides.

12. The kaleidoscope of claim 1, wherein said housing includes:
   shaft support means for rotatably mounting said drive shaft;
   hub support means for rotatably mounting a hub surface of said inner object wheel; and
   gear support means for rotatably mounting said system drive gear.

13. The kaleidoscope of claim 12, wherein said gear support means comprises a screw providing an axle about which said system drive gear rotates.

14. The kaleidoscope of claim 13, wherein said gear support means comprises means for rotatably mounting a hub of said system drive gear.

15. A kaleidoscope comprising:
   a partly transparent outer object wheel, with an outer visible pattern on a flat surface thereof;
   a partly transparent inner object wheel, with an inner visible pattern on a flat surface thereof;
   a filter surface for directing diffused light through said outer and inner object wheels when said filter surface is held toward a light source;
   a housing extending from said filter surface to a viewing port;
   a pair of angularly-separated, inward-facing, elongated reflective surfaces extending within said housing between said inner object wheel and said viewing port, exposing a fractional portion of said inner object wheel to said viewing port;
   a crank extending outward from a side of said housing, rotatably mounted within said housing;

mounting means to mount said outer and inner object wheels to turn about a common axis; and drive means for rotating said outer and inner object wheels in opposite directions when said crank is turned.

16. The kaleidoscope of claim 15, wherein said mounting means comprises:

a central hole through said inner object wheel;

a shaft extending inward within said housing from a center of said outer object wheel, fastened to said outer object wheel, rotatably extending through said central hole; and support means for rotatably mounting said shaft and said inner object wheel within said housing.

17. The kaleidoscope of claim 16, wherein said support means comprises:

shaft support means for rotatably mounting an end of said shaft opposite said outer object wheel;

a hub portion of said inner object wheel extending inward within said housing; and wheel support means for rotatably mounting said hub portion within said housing.

18. The kaleidoscope of claim 17, wherein said drive means comprises:

an inner wheel drive gear rotatably mounted on said shaft, engaging said hub portion to turn therewith;

an outer wheel drive gear attached to said shaft to turn therewith; and a system drive gear, mounted to turn with said crank, meshingly engaging said inner and outer wheel drive gears at opposite sides of said system drive gear.

19. The kaleidoscope of claim 18:

wherein said inner and outer wheel drive gears are spur gears; and wherein said system drive gear is a crown gear.

20. The kaleidoscope of claim 19, wherein said drive gears are bevel gears.

* * * * *